Dec. 27, 1927.

W. G. WILSON

VALVE

Filed Jan. 25, 1926

INVENTOR.
Wylie G. Wilson
BY James L. Stewart

ATTORNEY.

Dec. 27, 1927.

W. G. WILSON

VALVE

Filed Jan. 25, 1926

Wylie G. Wilson INVENTOR.
BY James L. Stewart
ATTORNEY.

Patented Dec. 27, 1927.

1,654,517

UNITED STATES PATENT OFFICE.

WYLIE G. WILSON, OF JERSEY CITY, NEW JERSEY.

VALVE.

Application filed January 25, 1926. Serial No. 83,421.

This invention is a valve.

In the valve art, it is of fundamental importance that the seal effected by the valve be a tight seal and that the valve be capable of functioning a great number of times without becoming leaky, i. e., it should be repetitive in character, while retaining its capacity to produce a tight seal.

Pursuant to the practices of the prior art, valve seals have been formed by bringing a rigid sealing element into engagement with a rigid seat, or by forming one of these elements of material which is permanently deformed or distorted in producing the seal, or by interposing a gasket, composed of permanently deformable material, intermediate the sealing element and its seat. In the first instance, difficulties are encountered in accomplishing a tight seal because of irregularities in the two surfaces incident to their construction, to wear, to the presence of foreign matter between them, or to other causes. In the second and third instances, the deformable bodies very soon become so permanently distorted, as result of wear, physical deterioration or other cause, that they can no longer produce a tight seal. In all the prior art structures, frequent inspection and repairs, at very considerable annoyance and expense, are necessary in order to maintain tight valves.

With these considerations in mind, the primary object of the present invention is to provide a valve capable of effecting a tight seal throughout long periods of repetitive use and under operating conditions, whereunder the valves of the prior art become ineffective after a relatively short period.

Another object of the invention is to so constitute the sealing element or elements and so operate them, that they may be constructed economically and without that refined workmanship which is usually incident to the grinding of valves and valve seats so that they will cooperate perfectly. The present structures are such that, even though in their primary manufacture they may not be axially coincident with relation to each other or of truly complementary shape, yet in the operation of the valve, they will adjust themselves to such irregularities and compensate for the same by reason of the material from which they are manufactured and the particular form employed in this connection.

Speaking generally the valve of this invention embodies a substantially cylindrical port opening, the wall of which constitutes a valve seat. Into and out of this port opening, a sealing element is adapted to be moved and an adjustable stop or abutment is provided to limit the extent to which the sealing element can be moved into the cylindrical port opening. The sealing element is of composite hollow conical form, and of substantially discus shape, in that it comprises two hollow conical sections integrally united at their bases and having a common peripheral edge.

I have discovered that a hollow sealing element of the shape described will function with remarkable efficiency in the formation of a tight seal, when such sealing element is constructed from materials which, for the purpose of this invention, are termed "obdurate materials". By this term is meant materials which are bendable, but not easily bent, compressible, but not easily compressed, elastic, but not easily deformed. As examples of obdurate materials, I may mention, without excluding others, iron, steel, hard alloys (such as bronze), glass, ceramic materials, hard rubber, and wood. These materials are in pronounced contradistinction to those, which may be termed "non-obdurate", such as leather, asbestos, soft rubber, soft metals, etc.

The obdurate materials, when employed pursuant to this invention, are operated within their elastic limit, by which I mean that, when embodied in the form of a sealing element and placed under stresses which tend to deform said element, incident to producing a seal, the element shall retain a positive tendency to resume its original form when the stresses are relieved.

I have discovered that when a hollow sealing element of discus shape and of obdurate material is compressed axially, its outer periphery extends substantially in a circle; that is, the expansion is uniform all around when meeting with uniform resistance all around, and, accordingly, its periphery may be utilized to form a fluid tight seal with a suitable seat. It is to be noted that the discus is unbroken and that its periphery should be continuous and not slotted or formed into fingers, otherwise a proper seal could not be produced nor could the sealing element be properly stressed in the sense that is required in this invention to produce the seal.

By "axial compression", I mean pressure exerted upon the sealing element in a direction coaxial with or parallel to its axis, whereby its altitude is diminished and the peripheral diameter of its base increased.

Attention is particularly directed to the fact that the stressing of the sealing element or elements must be within the elastic limit thereof; otherwise, said element would not tend to resume (i. e., tend to spring back to) its normal unsealing form.

The term "elastic limit," as employed in the specification and claims of this application, is so employed to designate that quality or characteristic of the conical forms of obdurate material employed which, when compressed within predetermined limits and then relieved of such compression, will cause said conical form to tend to return to approximately its original form and size. It is intended that such compression shall be within and not beyond the tendency of said conical section to return to its original form and size. That is to say, it is intended that the degree of axial pressure employed shall not be sufficient to break down and destroy the resilient or reactive quality of the conical form herein described. On the contrary, it is the purpose in practicing this invention that the degree of compression employed shall be limited to a degree where such reactive characteristic of said conical form will not be seriously affected.

For a better understanding of the operation of the sealing element of hollow discus or composite conical form, it is suggested that it functions like a toggle. This analogy is, of course, not absolute, but when considered in that light, it may be helpful to a clearer conception of the operation of the invention. When force is applied to the elbow of a toggle, a greater force is exerted at the ends of the toggle links, and this force increases in proportion as the axial dimension of the toggle relative to the distance between the ends of the links, becomes less and less.

The sealing element of the present invention may be considered as functioning like a multiplicity of toggles; that is to say, there is a toggle-like action in each diametric plane, and, obviously, there is an infinite number of toggles. When the sealing element is compressed axially, the dimensions of such element and the proportioning of the obdurate material of which it is composed, bring about, within the element, the steadily increasing functional characteristics incidental to toggle action. This action results in a cross axial or radial movement of the sealing element until its periphery or peripheries are forced into tight sealing engagement with cooperating seats. The obdurate element is so dimensioned and proportioned that the seal is effected, in the manner described, before the elastic limit of the element is reached. Accordingly, upon release of the stresses incident to producing the seal, the element tends to autogenously, i. e., automatically, break the seal.

It therefore follows that in a valve embodying this invention, the seal is effected by stressing a sealing element of obdurate material within its elastic limits and that the seal is maintained as long as the element is thus stressed. However, when these stresses are relieved the seal is broken.

Particular attention is called to the fact that the valve seat is substantially cylindrical, since this allows the sealing element to be moved into a predetermined relationship with the seat and thereupon stressed into sealing engagement with said seat. The exact position of such engagement is controlled by a stop or abutment which extends into the path of the sealing element and is adapted to be engaged thereby. The stop or abutment is adjustable in an axial direction, so that, as one part of the seat becomes worn, the sealing element can be caused to cooperate with another and unused portion of the seat. This feature is of marked practical importance since it materially adds to the life of the valve.

The valve of this invention is repetitive in that it can be operated a great number of times without serious distortion of the parts. This is due to the employment of an obdurate sealing element of the form described and to the use of an adjustable stop cooperating with a cylindrical seat. Through the cooperation of these features, a highly meritorious valve is obtained.

In the valve of this invention, the sealing element may be brought into relation with the seat at any part of the length of the seat, and preferably makes contact therewith in a plane perpendicular to the axis of the seat. By reason of its peculiar construction, the sealing element adapts itself to slight irregularities of this seat, and since the sealing relation may be produced at any part of the seat, it is possible by successively changing this location, to maintain the elements in operative condition for long periods of time without dismounting for repairs.

Features of the invention, other than those adverted to, will be apparent from the hereinafter detailed description and claims, when read in conjunction with the accompanying drawings.

The accompanying drawings illustrate one practical form of the invention, but the construction therein shown is to be understood as illustrative only, and not as defining the limits of the invention.

Figure 1:
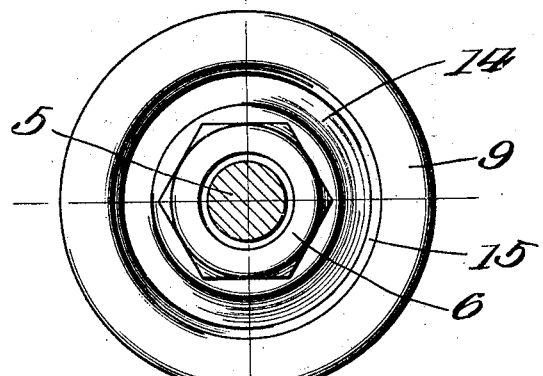
Figure 1 is a top view of the seat member of the valve, with the sealing element shown in sealing position therein, the valve stem being in section.
Figure 2:
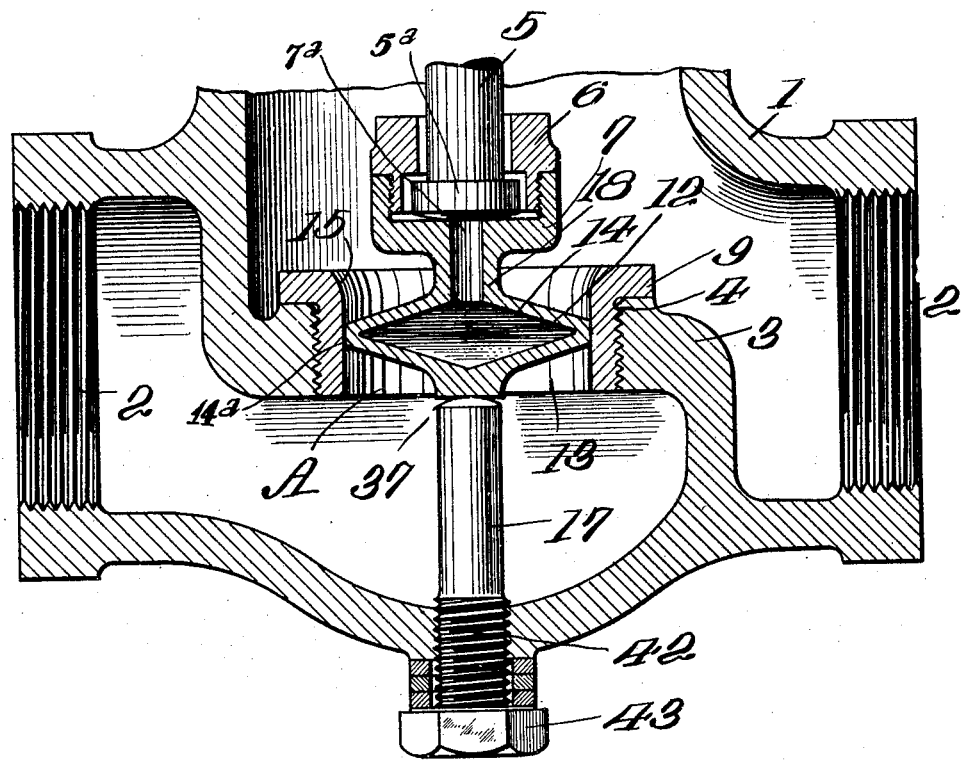
Figure 2 is a section through the valve, with the upper portion of the casing broken away.
Figure 3:
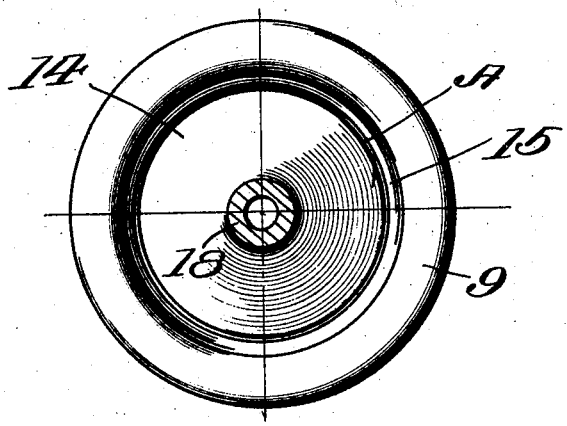
Figure 3 is a view similar to Figure 1, but with the sealing element in non-sealing position; and, Figures 4 and 5 are sections showing the sealing element in sealing and unsealing positions, respectively.

In the drawings, the valve is represented as having a casing 1, provided with interiorly threaded inlet and outlet passages 2 and formed interiorly with a partition or diaphragm 3, having an opening 4. A seat ring 9 is threaded into this opening and has a cylindrical port opening A, the wall 15 of which forms the valve seat.

The valve stem 5 is operable through the customary bonnet, with which it has threaded connection, and is provided at its lower end with an enlargement 5ª. This enlargement is seated in a pocket in the valve spindle 7 and a collar 6 is threaded into the pocket to secure the parts together.

The sealing element 14 is shown as depending from and joined to the spindle by a reduced neck 18. This sealing element is of the hollow discus form specified, and embodies two conical sections 12 and 13 integrally united at their bases to form a common peripheral edge 14ª. At the apex of the section 13 is formed an exterior axial stud 37.

Threaded through the bottom of the casing is a post 17, arranged coaxially of the valve stem, sealing element and seat, and projecting upwardly into the path of the stud 37. Exteriorly of the valve casing this post has a head 43 shaped to receive a wrench, and suitable washers serve to preclude leakage through the threaded joint 42 between the post and casing.

Figure 4:
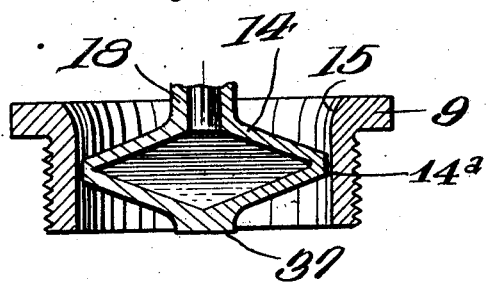
Figure 5:
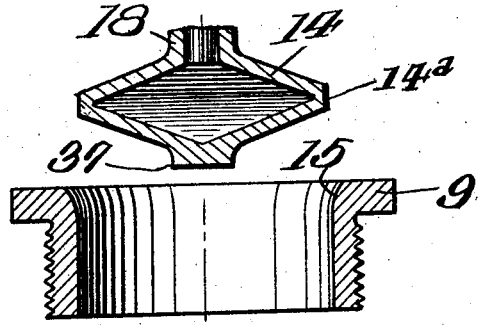

The relationship of the sealing element and seat, when the valve is in unsealing condition, is as shown in Figure 5. When it is desired to effect a seal, the valve stem is rotated to move the sealing element axially into the position of Figure 4, from which it will be noted that the diameter of the sealing element is such as to permit its entry into the valve port without binding. The movement of the sealing element into the port may be continued until the stud 37 engages the post 17 which thereafter acts as a stop to preclude further bodily movement of the seal element. If the operator continued to screw down the stem 5 after the stud has been engaged by the post, the sealing element will be placed under axial compression to bring about a decrease in its altitude and a simultaneous expansion of its periphery. In this manner, the peripheral edge 14ª is expanded into tight sealing engagement with the seat 15. Inasmuch as the sealing element is of obdurate material, this operation will place said element under stresses which will continue so long as the seal is maintained. However, when the valve stem is unscrewed, stresses will be relieved and will autogenously cause the sealing element to spring back, or tend to reassume, for all practical purposes, its normal unsealing form, so that the seal will be efficiently broken. The sealing element can thereupon be readily returned to the open position of Figure 5.

During these operations of the sealing element, it is desirable that no gas or liquid become pocketed in the hollow sealing element and for this reason, the neck 18 and the spindle 7 are shown as provided with a relief passage 7ª and the collar 6 has a loose fit about the valve stem, so that the pressure within the hollow sealing element may be maintained at all times substantially the same as within the valve chamber at the inlet side of the diaphragm.

It will be apparent from the operation of the valve as described, that the sealing element may be readily moved into and out of cooperative relation with the valve seat and through a stressing of said sealing element a tight liquid impervious seal can be readily produced. Any slight wear which occurs in the course of time between the seat and the sealing element can, as stated, be compensated for by adjustment of a stop 17 to a slightly different position. The valve, therefore, may be adjusted, without removing the cap or bonnet, to insure long life and little maintenance.

It is of importance in practice that a sealing element, constructed as described and of obdurate material will produce a tight seal even though there are slight irregularities in the valve seat or in the periphery of the sealing element and even though these parts are slightly out of round. Moreover, it is found that ordinary machine parts may be utilized to produce an impervious seal in the manner described, so that lapping or grinding which are almost universally necessary in the formation of tight seals are entirely unnecessary in the valve of the present invention.

The foregoing detailed description sets forth the invention in its preferred practical form, and the invention is to be understood as fully commensurate with the appended claims.

Having thus fully described the invention, what I claim as new and desire to secure by Letters Patent is:

1. In a valve, a casing provided with a cylindrical seat, a valve stem, a sealing element of obdurate material and of hollow, substantially discus shape carried by the valve stem and movable thereby into and out of loose cooperative relation with the seat, a stop extending into the path of the sealing element to arrest its movement when said sealing element arrives at a predetermined position with reference to the seat, whereupon the application of force to the sealing element by the valve stem to place the sealing element under axial compression will stress the sealing element within its elastic limit to expand its peripheral edge into tight sealing engagement with the seat.

2. In a valve, a casing provided with a cylindrical seat, a valve stem, a sealing element of obdurate material and of hollow, substantially discus shape carried by the valve stem and movable thereby into and out of loose cooperative relation with the seat, a stop extending into the path of the sealing element to arrest its movement when said sealing element arrives at a predetermined position with reference to the seat, whereupon the application of force to the sealing element by the valve stem to place the sealing element under axial compression will stress the sealing element within its elastic limit to expand its peripheral edge into tight sealing engagement with the seat, and means for adjusting the stop to cause the sealing element to form a seal with the seat at different predetermined zones longitudinally of said seat in order to compensate for wear.

3. In a valve, a valve stem, a substantially cylindrical valve seat, a sealing element of obdurate material embodying two hollow conical sections joined at their bases, one cone having a bearing stud at its apex and the other cone being secured at its apex to the valve stem, an adjustable stop extending into the path of said stud, and means to move the valve stem longitudinally for the purpose of bringing the stud into engagement with the stop and thereupon applying axial pressure to the sealing element to stress it within its elastic limit for the purpose of radially expanding the periphery of said element into tight sealing relation with the seat.

4. In a valve, a cylindrical valve seat, a sealing element of obdurate material and comprising two hollow conical sections integrally united at their bases and having a common peripheral sealing surface, means to position said sealing element within said cylindrical seat, a stop axially mounted with respect to said cylindrical seat and means to compress said sealing element axially between said stop and such compression means to expand said seal into sealing relation with said seat.

5. In a valve, a cylindrical valve seat, a sealing element of obdurate material and comprising two hollow conical sections integrally united at their bases and having a common peripheral sealing surface, means to position said sealing element within said cylindrical seat, a stop axially mounted with respect to said cylindrical seat, and means to adjust the position of said stop with respect to said seat, and means to compress said sealing element axially between said stop and such compression means to expand said seal into sealing relation with said seat.

6. In a valve, a cylindrical valve seat, a sealing element adapted to cooperate with said seat, said sealing element being in the form of two hollow conical sections integrally united at their bases, and having a common peripheral sealing surface, said sealing element being formed of obdurate material as described, means for positioning said sealing element within said cylindrical seat, a stop axially mounted with respect to said cylindrical seat, said stop being adjustable in the line of said axis, and means for compressing said sealing element axially against said stop to expand said sealing element to accomplish a seal between said sealing element and said seat.

Signed by me at Jersey City N. J. this 29th day of December 1925.

WYLIE G. WILSON.